(12) United States Patent
Connolly

(10) Patent No.: US 7,284,728 B2
(45) Date of Patent: Oct. 23, 2007

(54) PIPE HANGER ASSEMBLY

(76) Inventor: Michael J. Connolly, 15827 Woodbridge Ave., Apt. 1, Harvey, IL (US) 60426

( * ) Notice: Subject to any disclaimer, the term of this patent is extended or adjusted under 35 U.S.C. 154(b) by 26 days.

(21) Appl. No.: 11/023,484

(22) Filed: Dec. 29, 2004

(65) Prior Publication Data
US 2006/0138286 A1    Jun. 29, 2006

(51) Int. Cl.
    E21F 17/02    (2006.01)
    F16L 3/00     (2006.01)
(52) U.S. Cl. .................. 248/62; 248/58; 248/61; 248/74.3; 403/21; 403/240; 403/316
(58) Field of Classification Search .................. 248/62, 248/58, 61, 74.3
    See application file for complete search history.

(56) References Cited

U.S. PATENT DOCUMENTS

| | | | | |
|---|---|---|---|---|
| 553,194 | A * | 1/1896 | Lewis | 248/61 |
| 2,641,428 | A * | 6/1953 | Kirk et al. | 248/55 |
| 2,714,497 | A * | 8/1955 | Denis | 248/62 |
| 3,051,424 | A * | 8/1962 | Duhamel | 248/62 |
| 3,415,474 | A * | 12/1968 | Kindorf | 248/62 |
| 3,427,656 | A | 2/1969 | Miller | |
| 3,652,045 | A | 3/1972 | Hirt | |
| 4,019,705 | A | 4/1977 | Habuda, Sr. et al. | |
| 4,019,706 | A * | 4/1977 | Weiland, Sr. | 248/62 |
| 4,164,203 | A * | 8/1979 | Cavanagh | 239/88 |
| 4,440,369 | A | 4/1984 | Banks | |
| 5,009,386 | A * | 4/1991 | Berger et al. | 248/613 |
| 5,082,216 | A * | 1/1992 | Roth | 248/62 |
| D330,672 | S | 11/1992 | Wilkinson, III | |
| 5,192,039 | A * | 3/1993 | Williams | 248/62 |
| 5,193,769 | A * | 3/1993 | Hofle | 248/59 |
| 5,219,427 | A * | 6/1993 | Harris | 248/59 |
| 5,474,269 | A * | 12/1995 | Kasubke | 248/74.1 |
| 5,678,609 | A * | 10/1997 | Washburn | 138/107 |
| 5,848,770 | A * | 12/1998 | Oliver et al. | 248/58 |
| 5,924,655 | A | 7/1999 | Rinderer | |
| 6,102,341 | A | 8/2000 | Ball | |
| 6,138,960 | A * | 10/2000 | Carbonare et al. | 248/62 |
| 6,164,604 | A * | 12/2000 | Cirino et al. | 248/74.3 |
| 6,224,025 | B1 * | 5/2001 | Alvarez | 248/58 |
| 6,454,232 | B1 * | 9/2002 | Roth | 248/228.1 |
| 6,505,796 | B1 * | 1/2003 | Roth | 248/62 |
| 7,005,581 | B2 * | 2/2006 | Burnette | 174/68.3 |

FOREIGN PATENT DOCUMENTS

CA          956620       10/1974

* cited by examiner

Primary Examiner—Korie Chan
Assistant Examiner—Michael McDuffie
(74) Attorney, Agent, or Firm—Richard C. Litman

(57) ABSTRACT

The pipe hanger assembly is a pipe hanger and a holding assembly for retaining the pipe hanger against a pipe support. The pipe hanger has an inverted, generally U-shaped yoke having a slot defined in the bight of the yoke, a U-shaped saddle for supporting the pipe, and a bolt connecting the yoke and the saddle to each other. The holding assembly is at least a bracket having a pair of flanges defining a guide channel, the bracket being attached to a stud, threaded rod, or other pipe support suspended from a ceiling. The pipe hanger is assembled to the pipe, the bracket is attached to the rod, and the yoke is slid onto the rod between the bracket and a keeper, the yoke being aligned with the guide channel. The keeper is tightened to secure the pipe hanger to the pipe support. A pair of embossments protrude from an inner surface of the saddle.

19 Claims, 4 Drawing Sheets

PIPE HANGER ASSEMBLY

BACKGROUND OF THE INVENTION

1. Field of the Invention

The present invention relates to fixtures for supporting pipe and conduit, and particularly to a clevis pipe hanger assembly.

2. Description of the Related Art

Pipe hangers, and specifically clevis pipe hangers, are often used for suspending piping from ceilings. The hangers typically comprise an upper hanger or yoke that is attached with a U-shaped lower hanger that supports the pipe. There is an elongated bolt extending through aligned apertures in the arms of the yoke and the U-shaped lower hanger. During installation, the clevis hanger is slid onto the pipe while the pipe is on the ground. Then, the installer lifts the pipe with the hanger and slides the clevis hanger into position for the support process. The installer secures the pipe and hanger by tightening a nut on the bottom of the bolt.

A problem arises when the installer is trying to raise the pipe and secure the lower hanger to the yoke. Generally the installer must climb a ladder while supporting at least one end of the pipe (a partner usually lifts and supports the other end of the pipe) with the U-shaped lower hanger disposed about the pipe and carrying the elongated bolt and nut. After aligning the apertures in the yoke and lower hanger, the installer must support the pipe on his shoulder while inserting the bolt through the aligned apertures. Quite frequently, during this process the installer will drop the nut, whereupon the installer must descend the ladder carrying the pipe with him, and then start the process over. In addition, the installer often must reach over his head and around the pipe while installing the nut onto the end of the elongated bolt. Again, the nut may be dropped, particularly if there is difficulty in getting the nut started onto the end of the bolt.

The process also poses safety issues, as the installer is trying to balance himself on the ladder, support the pipe, align the apertures in the yoke and the lower hanger, and maintain his grip on the bolt and nut, all at the same time.

Accordingly, there is a need for a device that allows a user to hang a pipe hanger from a pipe support without having to arduously fumble with washers and nuts while holding the pipe hanger up to the pipe support. Thus, there is a need for the pipe hanger assembly of the present invention solving the foregoing problems.

SUMMARY OF THE INVENTION

The pipe hanger assembly is a pipe hanger and a holding assembly for retaining the pipe hanger against a pipe support. The pipe hanger has an inverted, generally U-shaped upper yoke having a slot defined therein, a generally U-shaped saddle, and a bolt connecting the yoke and saddle to each other. The holding assembly includes at least a bracket. The bracket is a plate having opposed flanges defining a channel having a width slightly greater than the bight portion of the yoke. The plate has an aperture defined therein for mounting to a stud suspended from the ceiling. The holding assembly has to include a threaded rod and a plurality of washers and bolts for attaching the bracket to an existing ceiling. In operation, the bracket is attached to the ceiling and solely supported by washers and two nuts. The upper yoke and saddle fit loosely to the pipe, the pipe is raised, and the yoke is slid over the stud or threaded rod, the stud or rod being received by the slot, the bight being aligned in the bracket channel. The bottom nut is then tightened to secure the yoke to the bracket.

The pipe hanger assembly may include a pair of rounded embossments that protrude from the inner surface of the saddle. The embossments allow the pipe to be moved along the hanger without encumbrance.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
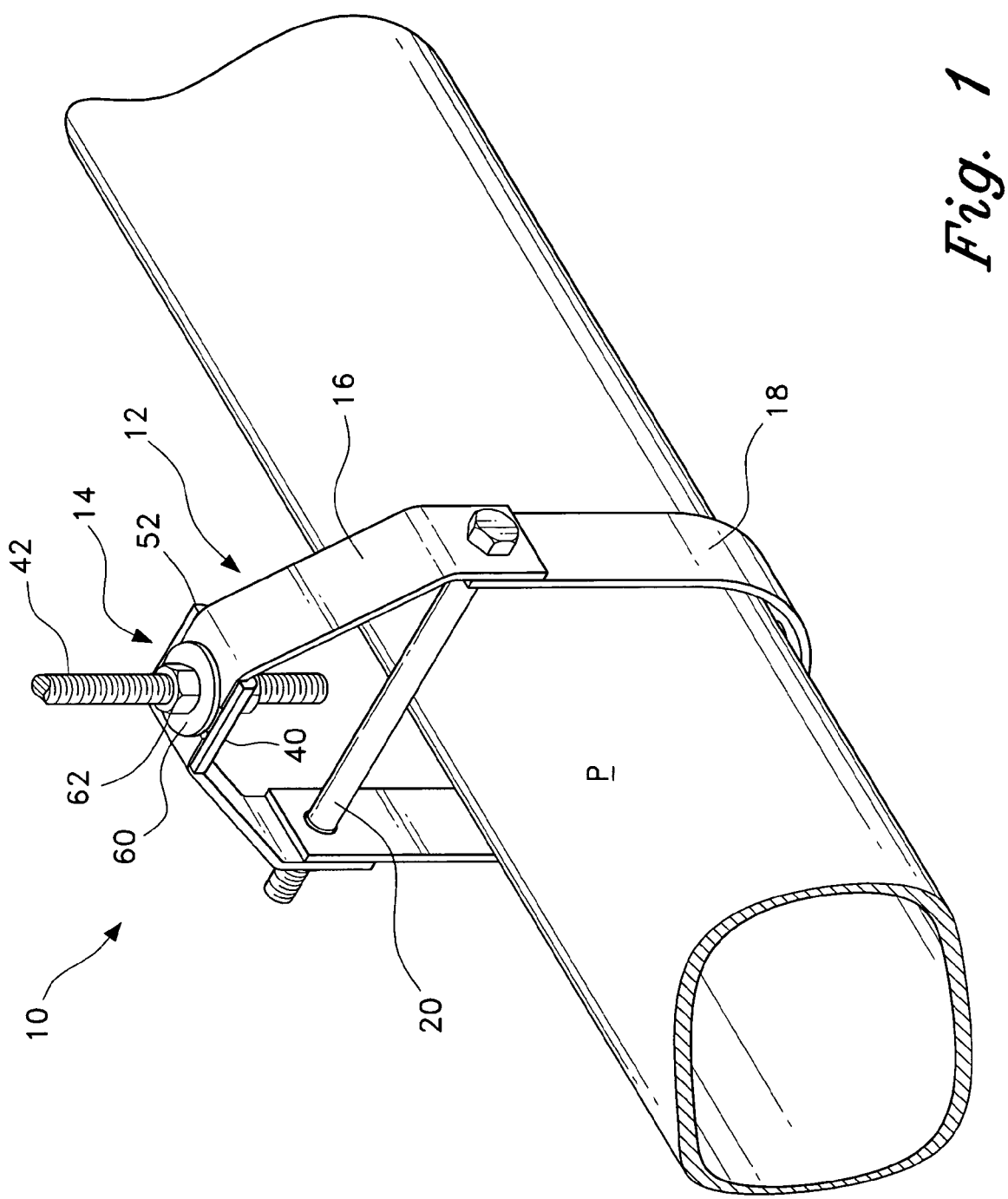
FIG. 1 is an environmental, perspective view of a pipe hanger assembly according to the present invention.

The present invention is a pipe hanger assembly, designated generally as 10 in the drawings. The pipe hanger assembly 10 generally comprises a pipe hanger and a holding assembly for attachment to a pipe support.

Referring first to FIG. 1, an environmental, perspective view of the pipe hanger assembly 10 is shown with a pipe P suspended from the pipe hanger assembly 10. The pipe hanger assembly 10 comprises a pipe hanger 12 and a holding assembly 14. The pipe hanger 12 has an inverted, generally U-shaped upper yoke 16 having a slot 32 defined in the bight of the yoke 16 (seen more clearly in FIG. 3), a generally U-shaped saddle 18, and a bolt 20 connecting the yoke 16 and saddle 18 to each other. The holding assembly 14 includes at least a bracket 40. The holding assembly 14 may also include a threaded rod 42, a plurality of washers 60 and 64 and a plurality of nuts 62 and 66. The bracket 40 is a plate having a pair of opposing flanges 52 defining a channel having a width slightly greater than the width of the bight of the yoke 16. The depth of the channel may be shallow, the channel serving to align the yoke 16 during installation of the pipe P. The holding assembly 14 is slidably engageable with the slot 32 defined in the yoke 16 and holds the hanger 12 to a pipe support 42.

Figure 2:
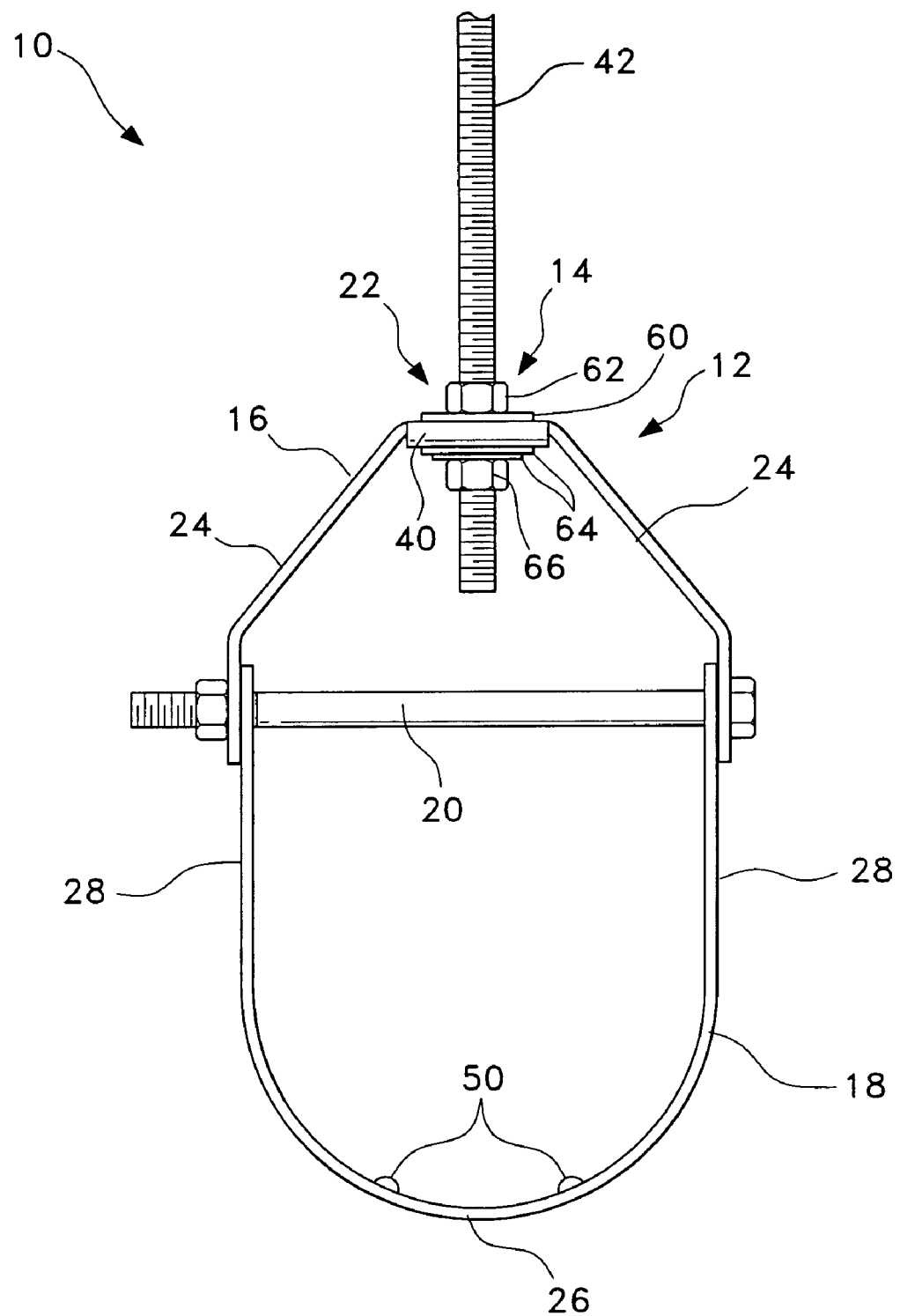
FIG. 2 is an elevational front view of the pipe hanger assembly according to the present invention attached to a ceiling mounted stud.

Turning now to FIG. 2, the yoke 16 has a planar bight 22 and a pair of arms 24 depending generally downwardly from the bight 22. The saddle 18 has an arcuate bight 26 and a pair of parallel arms 28 extending generally upwardly from the bight 26. The bight 26 supports the pipe P. The bolt 20 connects the yoke 16 and the saddle 18. The holding assembly 14 is slidably engageable with the yoke 16. The saddle 18 may have a pair of embossments 50 protruding from the inner surface of the bight 26. The embossments 50, located at approximately 80° and 100°, respectively, (0° being due west) allow the pipe P to be moved along or rotated in the hanger without encumbrance.

The holding assembly 14 may be attached to a threaded stud depending from the ceiling, or may include a threaded rod 42 used to attach bracket 40 to a supporting structure depending from the ceiling. When threaded rod 42 is used, an upper nut 62 is threaded onto rod 42. An upper washer 60 is slid onto rod 42 below nut 62. The bracket 40 has a center aperture 44 defined therein, and is placed on rod 42 above washers 64. The rod 42 may be inserted through a ceiling support structure before placing the bracket 40 onto the rod 42. The lower washers 64 are then placed onto the rod 42 below the bracket 40 and retained by threading a lower nut 66 onto the rod 42 (leaving sufficient play for yoke 16 to slide between bracket 40 and washers 64). Thus, the bracket 40 is attached to the ceiling.

The pipe hanger 12 is attached to pipe P. The pipe P is raised to the rod 42, and the yoke 16 is slid onto the rod 42, between the bracket 40 and one of the lower washers 64. The rod 42 is received in a slot defined in the yoke 16, the bight of the yoke 16 being received in the channel defined by flanges 52. The lower nut 66 is then tightened to secure the pipe hanger 12 to the bracket 40.

Figure 3:
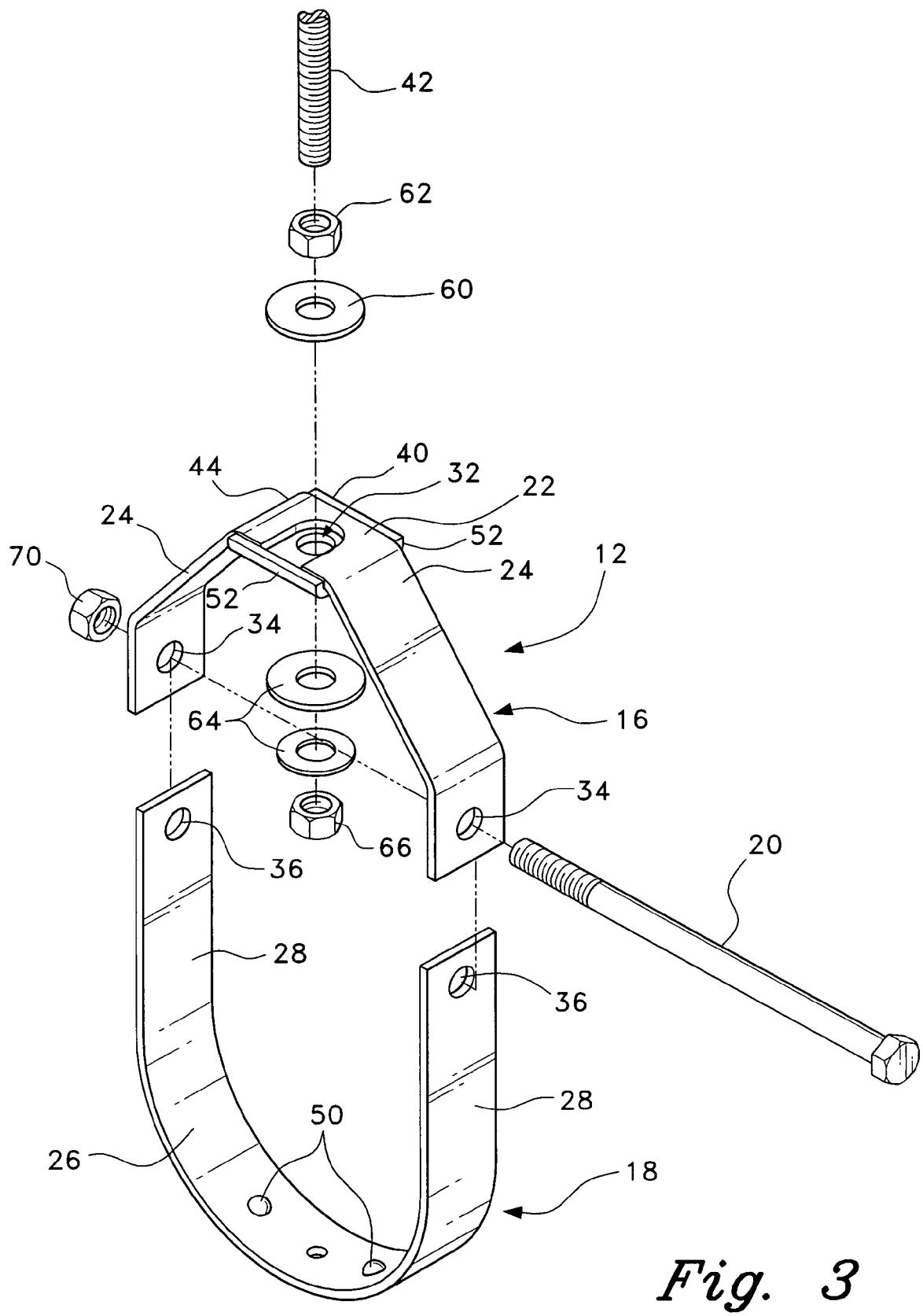
FIG. 3 is an exploded view of the pipe hanger assembly according to the present invention with the pipe support.

FIG. 3 shows an exploded view of the pipe hanger assembly 10. The U-shaped upper yoke element 16 has a planar bight 22 and a pair of arms 24 depending generally downwardly from the bight 22. The bight 22 has the slot 32 defined therein, the slot extending through the edge of the bight 22 to the center of the bight 22. Each of the upper arms 24 has an aperture 34 defined therein.

The saddle 18 is U-shaped and has a semicircular bight 26 and a pair of parallel arms 28 extending generally upwardly from the bight 26. The bight 26 retains the pipe P. Each of the lower arms 28 has an aperture 36 defined therein. The upper arms 24 overlap the lower arms 28 in order to align apertures 34 and 36. A clevis bolt 20 extends through the horizontally aligned apertures 34 and 36 and holds the yoke 16 and the saddle 18 together. The bolt 20 is held in place by securing a nut 70 to the end of the bolt 20 after the bolt 20 is extended through the apertures 34 and 36.

The holding assembly 14 allows the hanger 12 to be suspended from the pipe support 42. The holding assembly 14 includes at least bracket 40. The holding assembly 14 has to include washers 60 and 64 and nuts 62 and 66.

Figure 4:
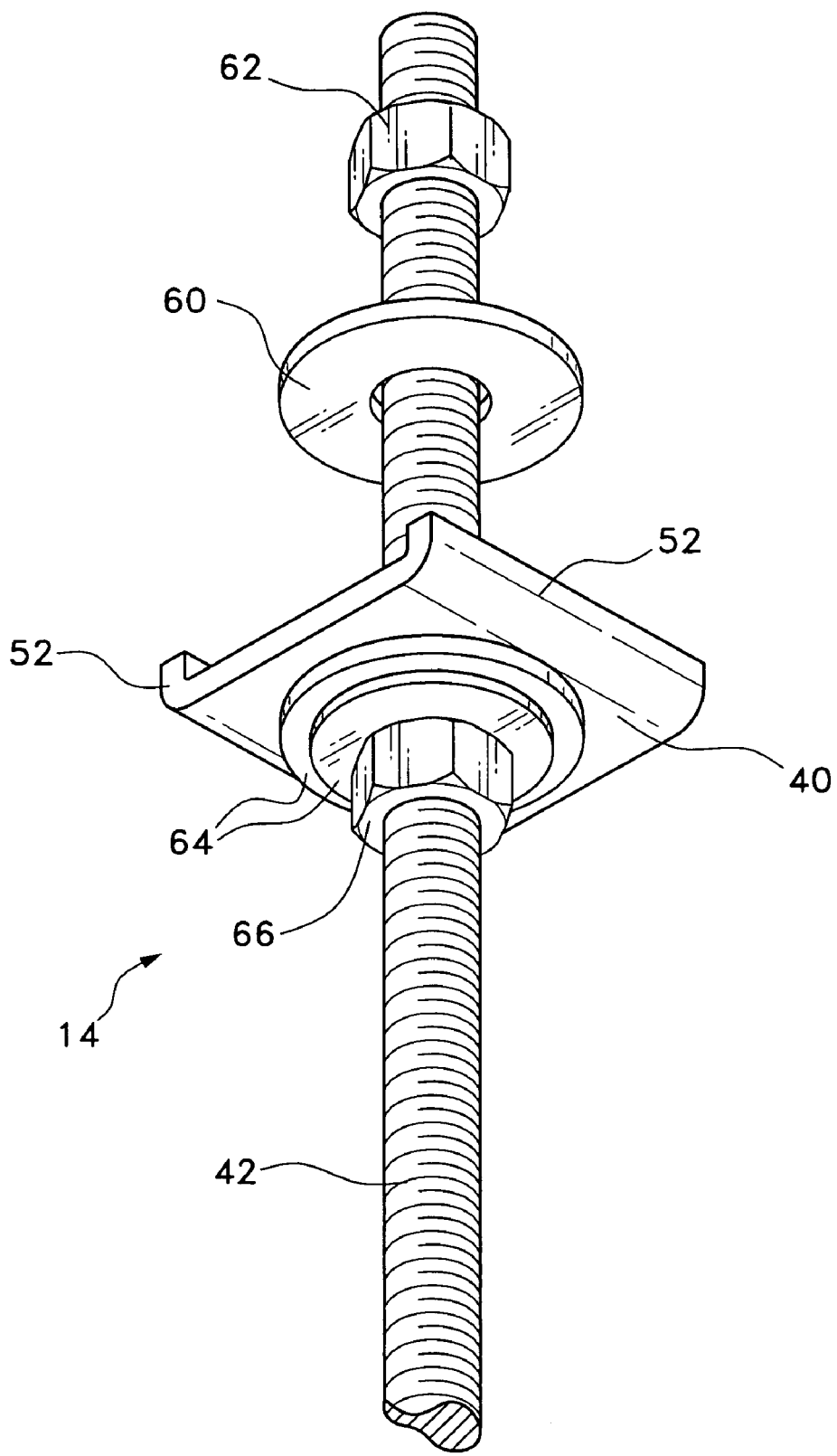
FIG. 4 is a perspective view of a holding assembly according to the present invention.

FIG. 4 shows the holding assembly 14 engaged with the rod 42. The lower nut 66 is threaded up the rod 42. The lower washers 64 are held in place by the lower nut 66.

While the pipe hanger assembly 10 has been illustrated supporting a pipe, e.g., for plumbing applications, it will be understood that the pipe hanger assembly 10 may be used in other applications, such as supporting electrical conduit, supporting exhaust pipes and other exhaust system components in a motor vehicle, or in any other application where it is desired to support a conduit that depends from a supporting structure. Further, the pipe hanger assembly 10 may be used with the saddle of a conventional clevis pipe hanger, requiring only the substitution of the yoke 16 for the upper hanger element of the conventional clevis pipe hanger and the addition of bracket 40. It will also be understood that the bracket 40 may be secured to any suitable pipe support structure, e.g., a smooth rod may be used in place of threaded rod 42 with an appropriate keeper that is capable of securing bracket 40 in a first position where there is enough slack to slide the yoke 16 onto the rod, and a second position to snug the yoke 16 into the channel defined by the bracket 40 and retain the pipe hanger and the weight of the pipe on the rod. An example of such a keeper may be a collar with a setscrew. If a threaded rod 42 is used, then the keeper need not be a hex nut 66, but may be a spring nut or the like.

It is to be understood that the present invention is not limited to the embodiment described above, but encompasses any and all embodiments within the scope of the following claims.

I claim:

1. A pipe hanger assembly, comprising:
a yoke having a bight and a pair of arms extending from the bight, the yoke being adapted for receiving a saddle of a clevis pipe hanger and having a slot defined in the bight extending through the edge of the bight to a closed end in the central portion of the bight; and
a bracket having a plate and a pair of flanges extending from the plate defining a channel having a width slightly greater than a width of the bight, the bracket being adapted for attachment to a pipe support by a keeper and the slot in the yoke being adapted for sliding onto the pipe support between the keeper and the bracket, the keeper being tightened to secure the yoke in the bracket channel.

2. The pipe hanger assembly according to claim 1, wherein the bight of said yoke is planar.

3. A pipe hanger assembly, comprising:
a clevis pipe hanger having:
a yoke having a bight and a pair of arms extending from the bight, the yoke having a slot defined therein extending through the edge of the bight to a closed end in a central portion of the bight;
a U-shaped saddle having a pair of arms and a bight connecting the arms, the saddle being dimensioned and configured for receiving a pipe; and
a bolt extending through aligned apertures defined in the yoke arms and the saddle arms for removable connecting the saddle to the yoke; and
a bracket having a central plate and a pair of flanges extending from opposing sides of the plate in order to define a guide channel, the bight of the yoke being received in the channel.

4. The pipe hanger assembly according to claim 3, wherein the yoke bight has an aperture defined therein adapted for receiving a rod, the assembly further comprising a keeper for retaining the bracket and the yoke on the rod.

5. The pipe hanger assembly according to claim 4, wherein said keeper comprises a nut adapted for attachment to a threaded rod.

6. The pipe hanger assembly according to claim 5, wherein said keeper further comprises at least one washer disposed between said nut and said yoke.

7. The pipe hanger assembly according to claim 3, further comprising a plurality of embossments extending from an inner surface of the saddle.

8. The pipe hanger assembly according to claim 3, wherein the yoke bight has an aperture defined therein, the assembly further comprising:
a rod adapted for attachment to a support structure, the rod extending through the bracket; and
a keeper attachable to the rod at a first position below the bracket, the yoke being slidable onto the rod between the bracket and the keeper with the rod being received in the slot, and at a second position securing the bight of the yoke in the channel defined by the bracket, thereby securing the clevis pipe hanger to the rod.

9. The pipe hanger assembly according to claim 8, wherein said rod is threaded.

10. The pipe hanger assembly according to claim 9, wherein said keeper comprises a nut.

11. The pipe hanger assembly according to claim 10, wherein said nut is a hexagonal nut.

12. The pipe hanger assembly according to claim 10, wherein said keeper further comprises at least one washer.

13. The pipe hanger assembly according to claim 8, further comprising a lower stop attached to said rod, said rod being adapted for insertion through a support structure, said rod being suspended by the lower stop.

14. The pipe hanger assembly according to claim 13, wherein said lower stop comprises a nut.

15. The pipe hanger assembly according to claim 14, wherein said lower stop further comprises at least one washer disposed on said rod above the nut.

16. A pipe hanger assembly, comprising:
a clevis pipe hanger having:
- a yoke having a bight and a pair of arms extending from the bight, the yoke having a slot defined therein extending through the edge of the bight to a closed end in a central portion of the bight;
- a U-shaped saddle having a pair of arms and a bight connecting the arms, the saddle being dimensioned and configured for receiving a pipe; and
- a bolt extending through aligned apertures defined in the yoke arms and the saddle arms for removably connecting the saddle to the yoke;
- a bracket having a central plate and a pair of flanges extending from opposing sides of the plate in order to define a guide channel, the bight of the yoke being received in the channel;
- a rod adapted for being suspended from a support structure; and
- a keeper removably attached to the rod and movable between a first position permitting the bight of the yoke to slide onto the rod between the bracket and the keeper, and a second position securing the bight of the yoke within the guide channel.

17. The pipe hanger assembly according to claim 16, further comprising a plurality of embossments protruding from an inner surface of the channel.

18. The pipe hanger according to claim 17, further comprising an upper stop attached to said rod for preventing the rod from passing through the support structure.

19. The pipe hanger assembly according to claim 18, wherein said rod is threaded and said keeper comprises a nut and at least one washer.

\* \* \* \* \*